CONTOUR COUNTER

Filed Oct. 3, 1947 2 SHEETS—SHEET 1

INVENTOR.
JOHN T. POTTER
BY Alfred W. Barber
ATTORNEY

Dec. 25, 1951 J. T. POTTER 2,580,192

CONTOUR COUNTER

Filed Oct. 3, 1947 2 SHEETS—SHEET 2

INVENTOR.
JOHN T. POTTER
BY Alfred W. Barber
ATTORNEY

Patented Dec. 25, 1951

2,580,192

UNITED STATES PATENT OFFICE 2,580,192

CONTOUR COUNTER

John T. Potter, New York, N. Y.

Application October 3, 1947, Serial No. 777,832

2 Claims. (Cl. 235—92)

The present invention concerns electronic counting devices.

In copending patent application entitled "Counters" filed on Nov. 13, 1943, and bearing Ser. No. 510,229, now Patent No. 2,538,122, is described an electronic decade counter. This counter is capable of counting according to the decimal system to a maximum count determined by the number of decades in the complete counter. Each decade utilizes four dual tubes connected in flip-flop circuits so that each tube has two conditions of stability. Transfer from one stable condition to the other may be brought about by the application of electrical pulses to be counted. Each stage normally counts two and four stages count to sixteen. By automatically jumping six counts at some predetermined count four tubes will count ten according to the decimal system. One decade will count to ten, two decades to one hundred, etc. This counter will count accurately at any rate of pulse occurrence up to some maximum rate of the order of one million counts per second.

There are cases where it is desirable to modify the response of an electronic counter to render it selective or non-critical in operation. Where the pulses to be counted are not subject to close control with regard to amplitude or wave-shape some means must be used ahead of the decade counter to equalize the pulses and to eliminate components which might give rise to false counts.

According to the present invention pulses to be counted are utilized to actuate a constant amplitude pulse generator and these constant amplitude pulses are fed to the decade counter for counting. It has been found according to the present invention that if the constant pulse generator is a flip-flop circuit having a low natural frequency, that pulses having occurrence rates somewhat below this natural frequency may be counted even though their amplitudes and wave-shapes vary widely. In a way, this circuit acts like a low pass filter having an extremely sharp cut-off. Further, according to the present invention, an electro-mechanical transducer, such as a crystal pick-up device, may be combined with the low-pass constant amplitude pulse generator and a decade counter to form a counter suitable for a number of novel counting applications. A stack of cards or paper may be counted merely by riffling them slightly and running the pick-up over them by hand. The number of threads on a machine screw, the number of turns on a coil of wire and numerous other counting operations may be quickly and accurately performed with the device of the present invention. The sensitivity and accuracy may be further improved, according to the present invention, by utilizing a special spade-shaped tip on the pick-up device.

One object of the present invention is to provide a method of and means for accurately and quickly counting a wide variety of objects.

A further object is to provide a counting device for a wide variety of objects which is accurate but which is non-critical to adjust and operate.

A still further object is to provide a counter embodying a very versatile pick-up device.

Another object is to provide a counting device particularly adapted to count accurately from a hand operated pick-up device.

These and other objects of the present invention will be apparent from the detailed description of the invention given in connection with the various figures of the drawing.

Figure 1:
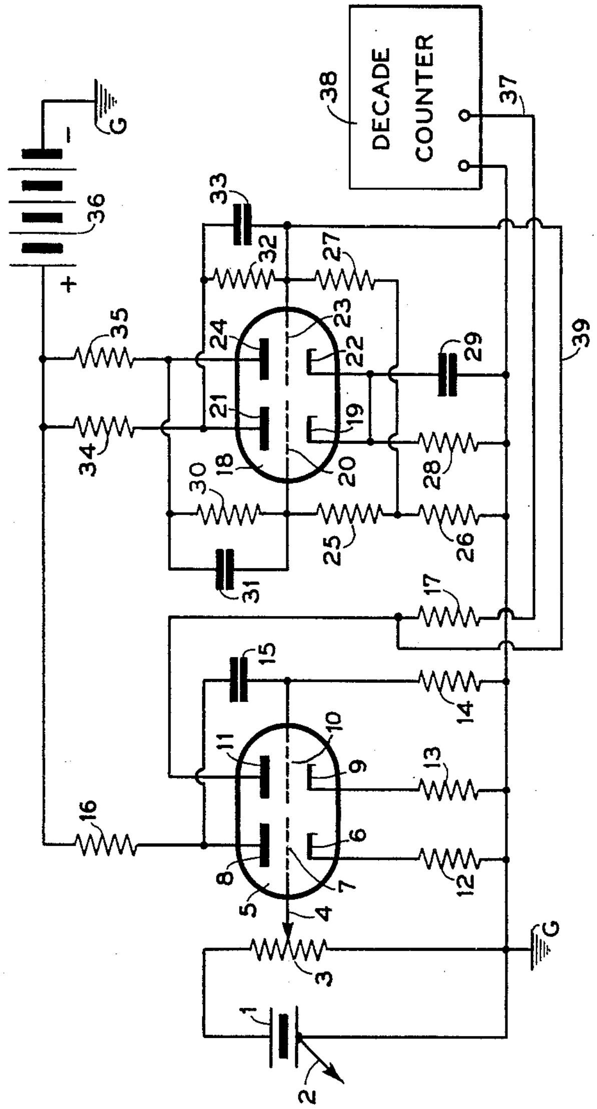
Fig. 1 shows an electrical circuit embodying the present invention.

Fig. 1 shows circuit details of the constant amplitude, special response pulse generator, mentioned above, connected between a suitable pick-up device such as the crystal pick-up 1 and a suitable counter 38 such as the decade counter described in the above mentioned patent. Pick-up 1 has an actuating device 2 shown and described in more detail in connection with Figs. 2, 3 and 4. The output from pick-up 1 is connected across load resistor 3 and its variable contact 4 is connected to grid 7 of amplifier tube 5. The input section cathode 6 is connected to ground G through a suitable bias resistor 12 and plate 8 is connected to a source of plate voltage 36 through load resistor 16. Amplified signal voltages from pick-up 1 appearing at plate 8 are applied to grid 10 of the output section of tube 5 through coupling condenser 15 and across grid resistor 13. Cathode 9 of this output section is connected to ground G through bias resistor 13. Thus further amplified signals from pick-up 1 appear at plate 11. Plate 11 receives its bias through its connection to trigger tube 18 as will be described below.

The trigger tube 18 receives amplified signals from plate 11 which cause its plate current to shift from plate 21 to plate 24 and then back again to plate 21 where it delivers a constant amplitude pulse back over lead 39 through resistor 17 to input lead 37 of the decade counter 38. The trigger tube 18 includes two triodes comprising cathode 19, grid 20 and plate 21 and cathode 22, grid 23 and plate 24. Plates 21 and 24 are connected through plate load resistors 34 and 35 respectively to plate voltage source 36. Cathodes 19 and 22 are connected to ground G through bias resistor 28 shunted by by-pass capacitor 29. Grids 20 and 23 are connected through grid resistors 25 and 27 respectively and common grid resistor 26 to ground G. Plate 21 is connected through resistor 32 shunted by capacitor 33 to grid 23 and plate 24, is connected through resistor 30 shunted by capacitor 31 to grid 20. If symmetrically located resistors in this circuit of tube 18 are made substantially equal, plate current will flow to either plate 21 or plate 24 and can be made to shift to the other plate by means of an input pulse as described in the above referred to application. The current with a symmetrical circuit will shift and remain flowing to either plate in a stable condition. However, if the circuit is not symmetrical as by making grid resistor 27 much larger than resistor 25, for instance 250,000 and 50,000 ohms respectively, the current will always flow to plate 21 in the steady state of the circuit. If, now, a positive pulse from pick-up 1 amplified at plate 11 is applied to grid 23 over lead 39 the plate current momentarily shifts to plate 24 and then returns to plate 21. In returning to plate 21 the output pulse described above is generated and fed to counter 38 where it is counted. The rate at which the current shifts from plate 21 to plate 24 and back to plate 21 is determined by the time constant of the circuits associated with tube 18 and, particularly, by the values of capacitors 31 and 33. One important feature of this circuit is that the circuit responds to input pulses which are slower than the repetition rate of this trigger circuit but not to faster pulses.

As an example a repetition rate of 300 times per second may be obtained with substantially the following circuit values:

R25=47,000 ohms
R26=100,000 ohms
R27=270,000 ohms
R28=15,000 ohms
C29=0.1 mfd.
R30=100,000 ohms
C31=0.02 mfd.
R32=100,000 ohms
C33=0.02 mfd.
R34=39,000 ohms
R35=39,000 ohms The circuit will respond to send out a pulse when it receives input pulses separated by more than $\frac{1}{300}$ second but will not respond to faster pulses. This has particular importance and significance in the present device since bounces and extraneous signals from the pick-up device are thus eliminated from the count giving the true desired count as set forth in more detail below.

Figures 2, 3, 4:
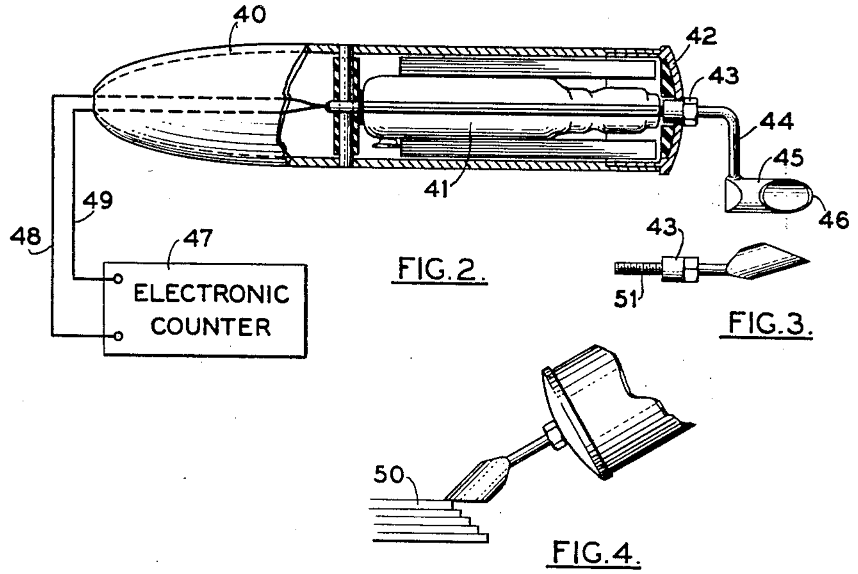
Fig. 2 shows a detailed view of one portion of the present invention.
Fig. 3 shows a side view of a portion of the device of Fig. 2.
Fig. 4 shows how the device of Fig. 2 is utilized.

Fig. 2 shows a detailed view of one form of pick-up device (see 1—2 of Fig. 1) particularly suited for use according to the present invention.

This pick-up includes a suitable electro-mechanical transducer such as crystal cartridge 41 housed in shell 40. The signal generated by cartridge 41 is applied over leads 48 and 49 to "electronic counter" 47 which may be taken to include the circuits of Fig. 1. The end of shell 40 is closed with a cap 42. The actuating nose piece 45 is mechanically connected through arm 44 and fitting 43 which screws into the crystal cartridge 41. Nose piece 45 has a substantially cylindrical form and is cut at approximately 45 degrees to form an elliptical opening and spade shaped end 46.

Fig. 3 shows a side view of this nose piece as well as screw 51 attached to fitting 43 for attaching the nose to cartridge 41.

Fig. 4 shows how the nose piece is used to count a stack of paper, cards, etc., which have been riffled to form steps 50.

Figure 5:
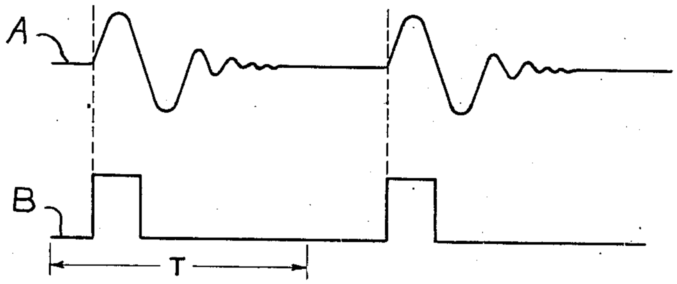
Fig. 5 shows electrical wave forms useful in explaining the mode of operation of the present invention.

Fig. 5 wave forms of a typical input wave A from the pick-up device and a typical output wave B from the trigger circuit of Fig. 1. The time T is the period of the trigger circuit during which interval only one output pulse can be induced even though the input wave may contain several vibrations due to bounce, scratch, etc. Curve A represents the output of the pick-up in traversing two objects being counted. It shows a main maximum excursion and several minor excursions. As long as the minor excursions take place within time T they will not induce extraneous counts. The main excursions will induce two output pulses, as shown by curve B, and the counter counting these will give a true indication of the number of objects being counted. The input trigger has a further advantage in that while it will accommodate a range of input pulse amplitudes it passes only constant amplitude pulses on to the counter.

While only a single embodiment of the present invention has been shown and described many variations will be apparent to those skilled in the art within the spirit and scope of the invention as set forth in the appended claims.

What is claimed is:

1. A counting device comprising an electro-mechanical transducer generating pulses in response to actuation thereof by successive engagement at a predetermined maximum rate with articles to be counted with intervals of predetermined minimum duration occurring between said successive engagements, said transducer being characterized by its generation of extraneous output pulses during said intervals; a one-shot multivibrator including input and output circuits, said one-shot multivibrator being actuatable by an input pulse from a stable mode to an unstable mode for generating in the output circuit thereof a large output pulse and thereafter self-recovering to its stable mode and further including capacitor means for prolonging the recovery time to an interval not less than said intervals of predetermined minimum duration occurring between said successive engagements of said transducer; means connecting the output of said transducer to the input circuit of said one-shot multivibrator; and an electronic counter coupled to the output circuit of said one-shot multivibrator for counting said relatively large output pulses to provide an accurate count of said generated pulses unaffected by said extraneous pulses.

2. A counting device comprising an electro-mechanical transducer generating pulses in response to actuation thereof by successive engagement at a predetermined maximum rate with articles to be counted with intervals of predetermined minimum duration occurring between said successive engagements, said transducer being characterized by its generation of extraneous output pulses during said intervals; a one-shot multivibrator including input and output circuits, said one-shot multivibrator being actuatable by an input pulse from a stable mode to an unstable mode for generating in the output circuit thereof a large output pulse and thereafter self-recovering to its stable mode and further including capacitor means for prolonging the recovery time to an interval not less than said intervals of predetermined minimum duration occurring between said successive engagements of said transducer; and means connecting the output of said transducer to the input circuit of said one-shot multivibrator.

JOHN T. POTTER.

REFERENCES CITED

The following references are of record in the file of this patent:

UNITED STATES PATENTS

| Number | Name | Date |
|---|---|---|
| 2,188,754 | Keeler | Jan. 30, 1940 |
| 2,266,401 | Reeves | Dec. 16, 1941 |
| 2,356,761 | Jones | Aug. 29, 1944 |
| 2,427,533 | Overbeck | Sept. 16, 1947 |
| 2,435,880 | Eilenberger | Feb. 10, 1948 |

OTHER REFERENCES

Time Bases by Puckle, pp. 50 and 51, 1943, published by John Wiley & Sons, Inc.

Design and Operation of an Improved Counting Rate Meter, pp. 323–333, September 1946, by Kip et al., Review of Scientific Instruments.